US011222209B2

(12) United States Patent
Diggins

(10) Patent No.: US 11,222,209 B2
(45) Date of Patent: **\*Jan. 11, 2022**

(54) COMPARING VIDEO SEQUENCES USING FINGERPRINTS

(71) Applicant: GRASS VALLEY LIMITED, Newbury (GB)

(72) Inventor: Jonathan Diggins, Lovedean (GB)

(73) Assignee: GRASS VALLEY LIMITED, Newbury (GB)

( * ) Notice: Subject to any disclaimer, the term of this patent is extended or adjusted under 35 U.S.C. 154(b) by 0 days.

This patent is subject to a terminal disclaimer.

(21) Appl. No.: 16/549,994

(22) Filed: Aug. 23, 2019

(65) Prior Publication Data

US 2019/0377954 A1 Dec. 12, 2019

Related U.S. Application Data

(63) Continuation of application No. 15/685,369, filed on Aug. 24, 2017, now Pat. No. 10,395,121.

(51) Int. Cl.
*H04N 21/854* (2011.01)
*H04N 21/8547* (2011.01)
(Continued)

(52) U.S. Cl.
CPC ..... *G06K 9/00744* (2013.01); *G06F 16/7328* (2019.01); *G06K 9/00758* (2013.01);
(Continued)

(58) Field of Classification Search
CPC ... H04N 21/20; H04N 21/2552; H04N 21/852
See application file for complete search history.

(56) References Cited

U.S. PATENT DOCUMENTS

2006/0187358 A1\* 8/2006 Lienhart .............. H04N 21/812
348/661
2008/0007614 A1 1/2008 Mizuhashi et al.
(Continued)

FOREIGN PATENT DOCUMENTS

EP 1056048 A2 11/2000
EP 2077663 A1 7/2009
(Continued)

OTHER PUBLICATIONS

Extended European Search Report from the European Patent Office for Application No. 17185979.6 dated Nov. 29, 2017 (12 pages).
(Continued)

*Primary Examiner* — Mushfikh I Alam
(74) *Attorney, Agent, or Firm* — Arent Fox LLP

(57) ABSTRACT

A first sequence of video fingerprints at a first image repetition rate is compared with a second sequence of video fingerprints at a second, different image repetition rate. A converted sequence of fingerprints is generated from the first or second sequence of fingerprints by forming a combination of the values of a number of neighbouring fingerprints. The combination is a weighted average based on the temporal location of the respective neighbouring fingerprints in the first sequence of fingerprints with respect to the fingerprint in the converted sequence. A correlation is then performed between the converted sequence of fingerprints and the other sequence of fingerprints.

5 Claims, 9 Drawing Sheets

(51) Int. Cl.
  *G06K 9/00* (2006.01)
  *G06F 16/732* (2019.01)
  *H04N 21/234* (2011.01)
  *H04N 5/04* (2006.01)
  *H04N 17/02* (2006.01)

(52) U.S. Cl.
  CPC ........... *G06K 9/00765* (2013.01); *H04N 5/04* (2013.01); *H04N 17/02* (2013.01); *H04N 21/23418* (2013.01)

(56) References Cited

U.S. PATENT DOCUMENTS

| | | | |
|---|---|---|---|
| 2009/0074235 A1* | 3/2009 | Lahr | G06F 3/04842 382/100 |
| 2009/0324199 A1 | 12/2009 | Haitsma et al. | |
| 2011/0289114 A1* | 11/2011 | Yu | H04N 21/4331 707/769 |
| 2012/0189212 A1 | 7/2012 | Ren et al. | |
| 2014/0193027 A1* | 7/2014 | Scherf | G06F 16/783 382/100 |
| 2014/0281004 A1* | 9/2014 | Bridges | H04N 21/4622 709/231 |
| 2015/0037006 A1* | 2/2015 | Tapper | H04N 9/8042 386/241 |
| 2015/0301718 A1* | 10/2015 | Trollope | G06F 16/632 715/716 |
| 2015/0319406 A1 | 11/2015 | Brasnett | |
| 2015/0370875 A1* | 12/2015 | Chupeau | G06F 16/783 707/756 |
| 2018/0053039 A1* | 2/2018 | Anders | G06K 9/00087 |
| 2019/0042647 A1* | 2/2019 | Oh | G06F 16/636 |

FOREIGN PATENT DOCUMENTS

| | | |
|---|---|---|
| NO | 2007148290 A2 | 12/2007 |
| NO | 2010046990 A1 | 4/2010 |

OTHER PUBLICATIONS

Search Report from the United Kingdom Intellectual Property Office for Application No. GB1614435.4 dated Feb. 28, 2017 (1 page).

\* cited by examiner

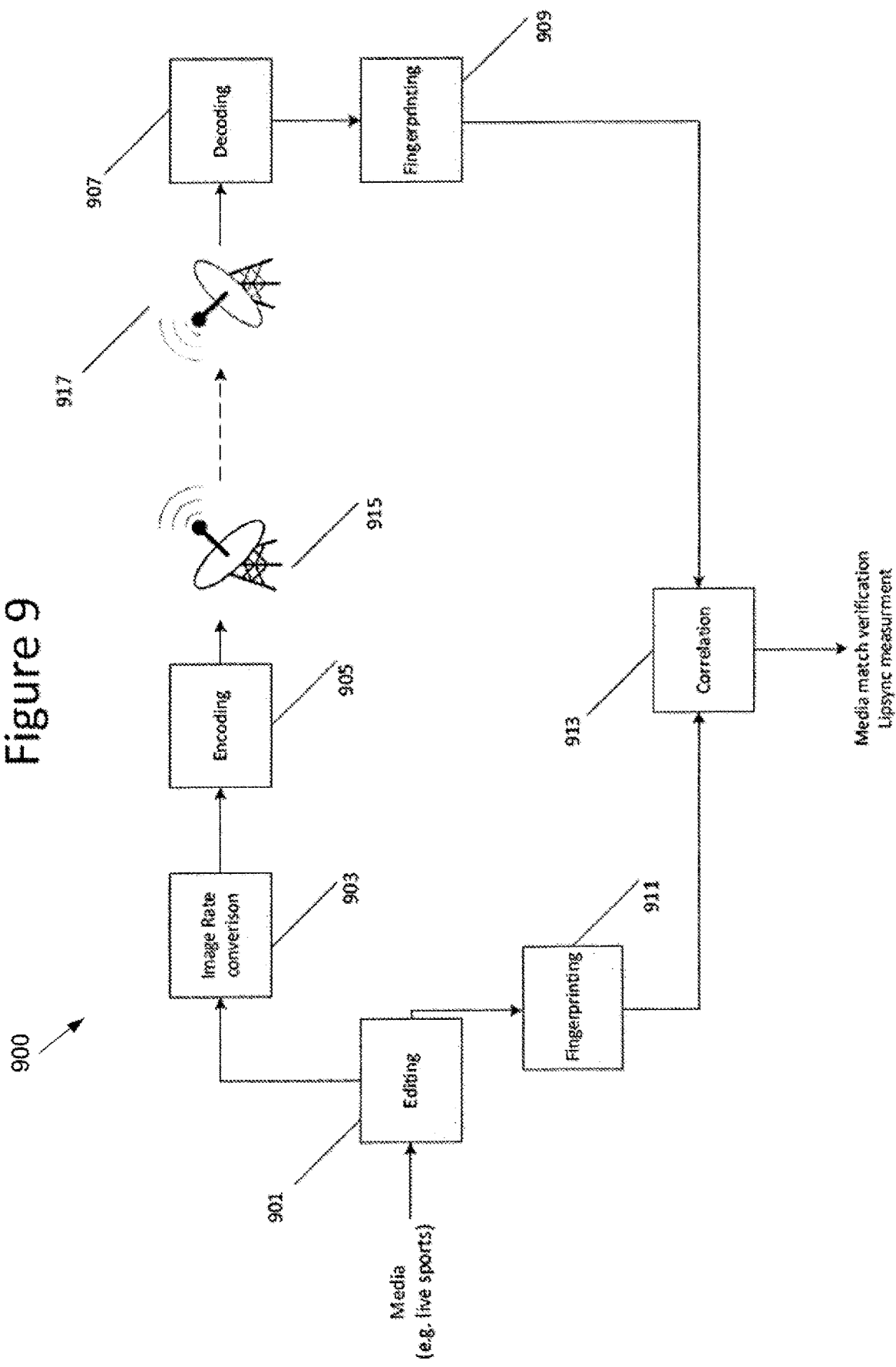

COMPARING VIDEO SEQUENCES USING FINGERPRINTS

CROSS-REFERENCE TO RELATED APPLICATION

This application is a continuation of U.S. patent application Ser. No. 15/685,369, filed Aug. 24, 2017, which claims priority to GB Application No. 1614435.4, filed Aug. 24, 2016, the content of each of which are incorporated herein by reference in their entirety.

FIELD

This invention relates to the control and monitoring of media workflows and in one example to the comparison of video for purposes such as monitoring delay and confirming content.

BACKGROUND

Many international video standards are in everyday use around the world, which have different image rates. In an increasingly automated world, intelligent monitoring of 'live' system workflows in which media may originate from different video standards, without the intervention of human operators, is a highly desirable capability and a commercial driving force. The problem is that, in order to do this, media identification, system delay and lip-sync monitoring applications need to be capable of accommodating comparisons between different video image rates, across multiple test points at physically separated positions along the broadcast chain, and on a large number of channels. There is currently no industry monitoring solution available to do this.

Video fingerprints (which are also sometimes referred to as 'signatures', or 'hash' values) can be used to characterize the video content with a low-bandwidth representation. Fingerprints from different test points can usefully be transmitted to a central application for correlation. However, existing systems, including such fingerprinting approaches, deal only with comparisons between video standards with the same image rate, or involve invasive processes, such as the insertion of appropriate test stimuli. These kinds of systems address the problem to a degree, but are only useable in offline, set-up scenarios. Such systems are not suitable for dynamic, non-invasive monitoring.

SUMMARY

In one embodiment a method of comparing a first sequence of fingerprints representing a first sequence of video images at a first image repetition rate with a second sequence of fingerprints representing a second sequence of video images at a second image repetition rate, different from said first image repetition rate is devised. The fingerprints may be spatial fingerprints derived each from the content of a single video image, temporal fingerprints derived each from a difference in content between two successive video images or a combination of spatial and temporal fingerprints. Embodiments of such a method may comprise the steps of generating from the first sequence of fingerprints a converted sequence of fingerprints at said second image repetition rate and performing a correlation between said converted sequence of fingerprints and said second sequence of fingerprints. In some embodiments generating the converted sequence of fingerprints comprises, for a fingerprint in the converted sequence, forming a combination of the values of a number of neighbouring fingerprints in the first sequence of fingerprints. Video images or sequences of video images may be compared for a variety of purposes. The comparison may validate that the correct video is being distributed. The comparison may enable a measurement to be made between corresponding images in different sequences, for example a measurement of relative delay or relative quality. The comparison may enable the identification of one image or sequences of images in a store or archive of images or sequences of images. In other embodiments, apparatus, systems and computer products are envisaged that may perform such methods.

BRIEF DESCRIPTION OF THE DRAWINGS

The invention will now be described by way of example with reference to the accompanying drawings, in which:

FIG. 9 is a system illustrating the data flow of the use of the correlation of a sequence of high frequency fingerprints and a sequence of low frequency fingerprints in determining if the content of European 50 Hz content is the same as the content of US 59.94 Hz content.

DETAILED DESCRIPTION

Figure 1:
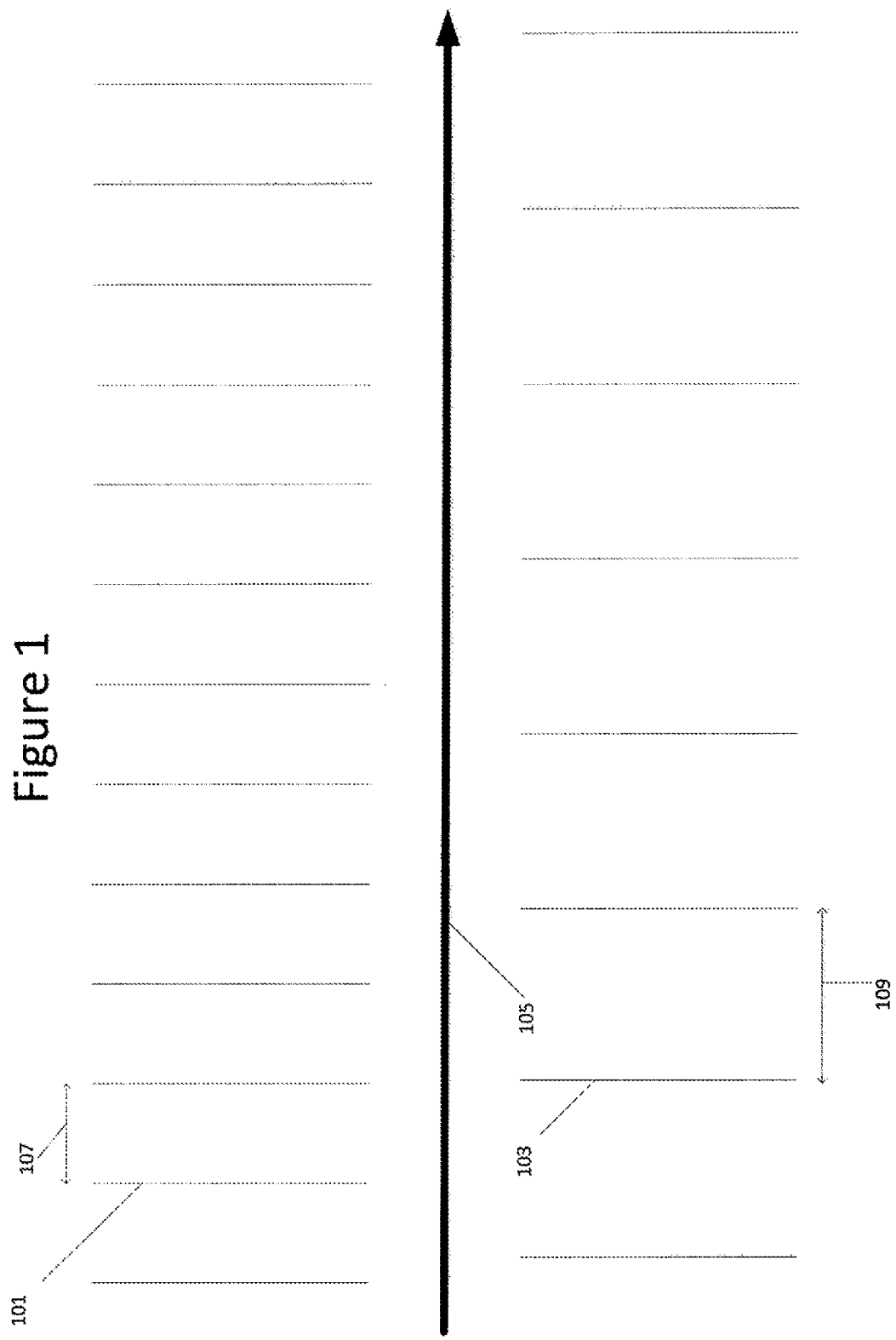
FIG. 1 is an illustration of a high frequency sequence of fingerprints and a low frequency sequence of fingerprints.

FIG. 1 shows a first sequence of fingerprints 103 with a low frequency representing a first sequence of video images at a first image repetition rate. FIG. 1 also shows a second sequence of fingerprints 101 with a high frequency representing a second sequence of video images at a second image repetition rate. The second image repetition rate is different from the first image repetition rate and in this example the second image repetition rate is higher than the first image repetition rate.

The fingerprints each represent an image from an image sequence. The fingerprints may be either temporal, or spatial, or a combination of the two. A temporal fingerprint is based on a measure of the difference between an image and the image that immediately precedes it (or a selected other image such as the image that immediately precedes it with the same parity). The generation of the fingerprints from their corresponding image is described with reference to FIGS. 6 and 7.

Arrow 105 is the axis of time. FIG. 1 therefore shows that the low frequency sequence of fingerprints 103 is periodic and repeats with an interval shown by arrow 109. The high frequency sequence of fingerprints 101 is also periodic and has a period shown by the second arrow 107.

Comparing the two sequences of fingerprints directly will not give an accurate reflection of the correlation between the two sequences. In any comparison at least some of the fingerprints would have an offset in position in the sequence from one another, and the average values of the fingerprints in the two sequences may be different. Moreover shot changes and cadence in one or both of the sequences may mean that any attempt to correlate the two sequences would lead to an inaccurate result.

Figure 2:
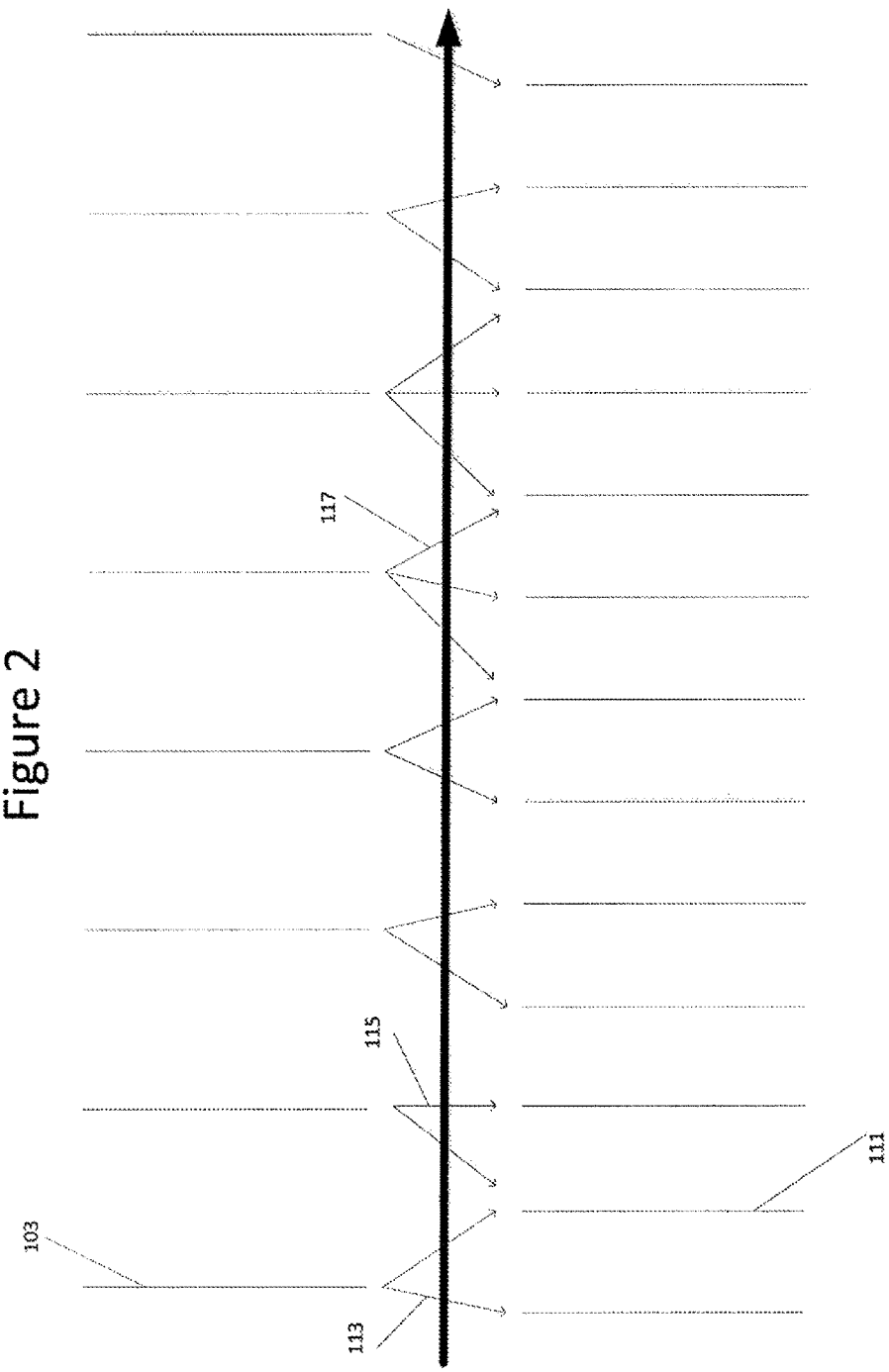
FIG. 2 is an illustration of the conversion of a low frequency sequence of fingerprints to a converted sequence of fingerprints with a higher frequency.

FIG. 2 shows the low frequency sequence of fingerprints 103 representing a low frequency sequence of video images at a first image repetition rate. FIG. 2 also shows a converted sequence of fingerprints 111. This sequence 111 has a higher frequency and image repetition rate than the low frequency sequence of fingerprints 103. The converted sequence of fingerprints 111 can be generated from the low frequency sequence of fingerprints 103. The generation may comprise forming a combination of a number of neighbouring low frequency fingerprints 103 to form a converted fingerprint 111. Arrows 113 show which of the low frequency fingerprints 103 neighbour each converted fingerprint 111. Each converted fingerprint 111 is a combination of the low frequency fingerprints 103 that are connected to it via an arrow 113.

One way of generating the converted sequence of fingerprints is to form a combination of the values of the two values of the neighbouring fingerprints in the first sequence of fingerprints 101.

In one embodiment this generation of the converted sequence of fingerprints 111 may be achieved by performing an average of two neighbouring fingerprints. In one embodiment this may be a weighted average, and preferably the weighting of this average may be dependent upon how close each of the neighbouring first fingerprints is to the position of the converted fingerprint. Other methods of generating the converted fingerprints may be used.

FIG. 2 shows an arrow 115 that links a low frequency fingerprint 103 with a converted fingerprint 111. These fingerprints are at the same position as one another on the time axis. In some embodiments the value of this converted fingerprint is taken as being the value of the low frequency fingerprint at this same time without performing an average. This is shown in FIG. 2 as this converted fingerprint only has one arrow linking it to a single neighbouring fingerprint from the low frequency fingerprint sequence 103.

Each fingerprint from the low frequency sequence may be the neighbour to a plurality of converted fingerprints. This is shown by arrows 117 that show a low frequency fingerprint being a nearest neighbour to three separate converted fingerprints. Two converted fingerprints in the sequence have the same two neighbouring low frequency fingerprints as one another. In some embodiments these will still have different values as the weighting of each neighbour will vary dependent upon the position of each converted fingerprint in the sequence.

In one embodiment low frequency sequence 103 is the same low frequency sequence 103 that is shown in FIG. 1. In some embodiments the converted sequence of fingerprints 111 has the same repetition rate and period as high frequency sequence of fingerprints 101 shown in FIG. 1. Preferably the converted sequence of fingerprints 111 is also in phase with the second sequence of fingerprints 101. This may not always be the case, however it may be advantageous.

The converted sequence of fingerprints may be generated in a generation module.

In one embodiment in which the fingerprints are temporal fingerprints the values of the first sequence of fingerprints may be scaled. Scaling is discussed below with reference to FIG. 3. This scaling may be done before the converted sequence of fingerprints is generated. In another embodiment the first sequence of fingerprints is not scaled, and instead the converted sequence of fingerprints is scaled. In this embodiment the same scaling factor is used as in the embodiment above. In another further embodiment no scaling is performed on either first sequence of fingerprints or the converted sequence of fingerprints. In some cases this may be due to the detection of cadence as discussed below in relation to FIG. 4.

Figure 3:
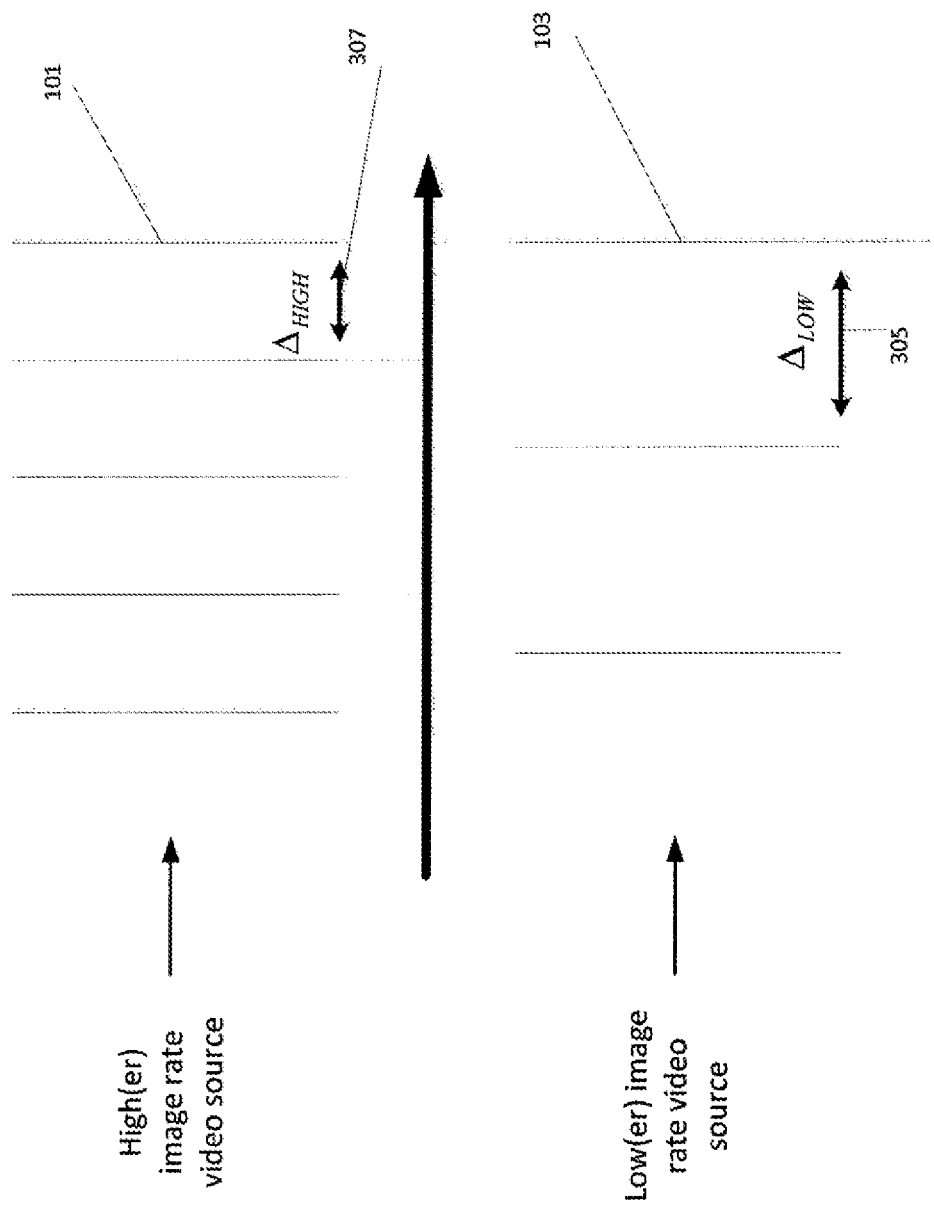
FIG. 3 is an illustration of a low frequency sequence of temporal fingerprints and a high frequency sequence of temporal fingerprints and the difference in the average values of said fingerprints.
Figure 6:
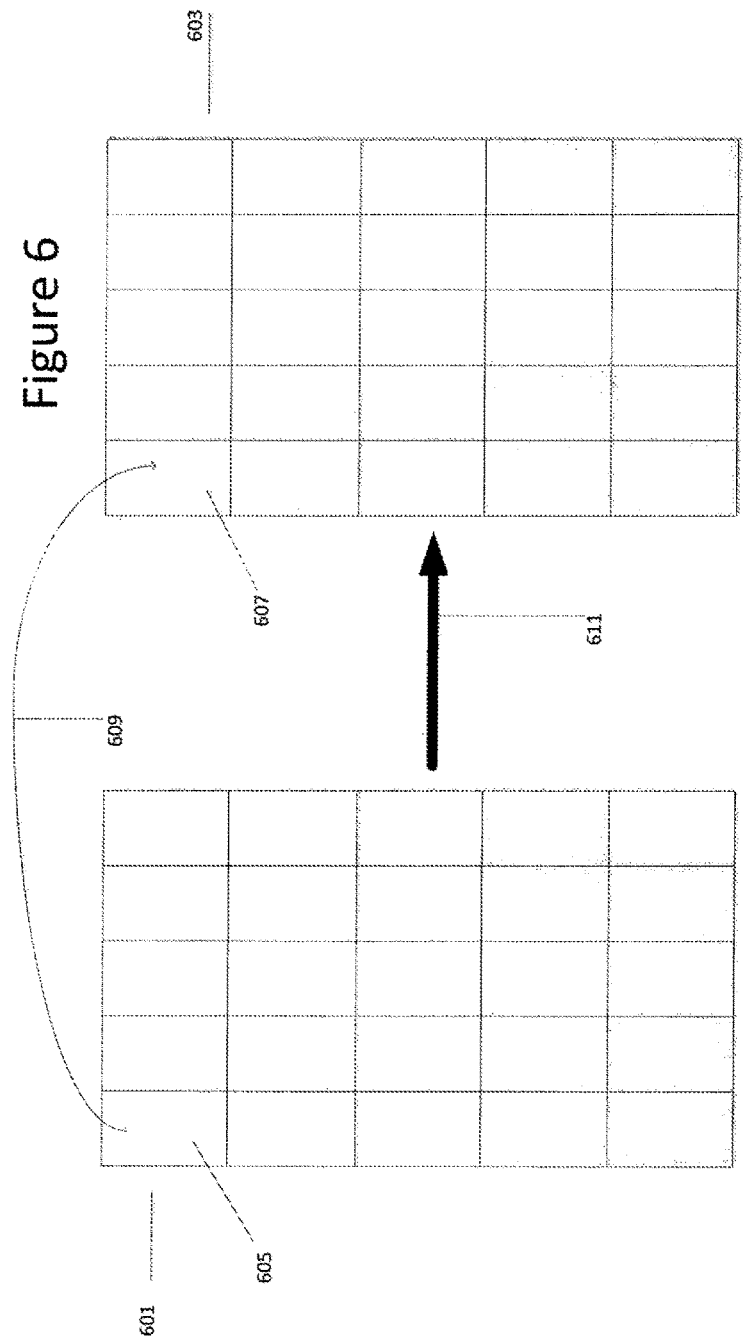
FIG. 6 is an illustration of the generation of a temporal fingerprint for an image from the image and the image immediately preceding it in a video sequence.

FIG. 3 illustrates the low frequency sequence of fingerprints 103, and the high frequency sequence of fingerprints 101. In the embodiment illustrated in FIG. 3 these fingerprints are temporal fingerprints. The generation of a temporal fingerprint is illustrated in FIG. 6. These fingerprints are each associated with an image and are derived from the temporal difference between the image and the one preceding it. The temporal difference between the images in the high frequency sequence 101 is depicted by $\Delta\_\text{"LOW"}$ 305. The temporal difference between the images in the low frequency sequence is depicted by $\Delta\_\text{"HIGH"}$ 307.

As the low frequency sequence of fingerprints 103 and the high sequence of fingerprints 103 have different repetition rates the difference between successive images in the image sequence the fingerprints represent will be different. A larger amount of time between images in an image sequence will make it more likely that, on average, the difference between successive images is greater. Therefore, $\Delta\_\text{"LOW"}$ 305 will on average be greater than $\Delta\_\text{"HIGH"}$ 307.

So on average the values of the temporal fingerprints making up low frequency sequence of fingerprints 103 will be larger than the values of the fingerprints making up high frequency sequence of fingerprints 101.

When comparing video image sequences with different image rates using temporal fingerprints it is thus advantageous to scale the fingerprints appropriately so that they have a similar average magnitude before performing any further processing. In one embodiment this can be done by noting that the equation 1 below holds:

$$\frac{\Delta_{HIGH}}{period_{HIGH}} \approx \frac{\Delta_{LOW}}{period_{LOW}}$$

This can be manipulated to form equation 2:

$$\Delta_{HIGH} \approx \Delta_{LOW}\left(\frac{f_{LOW}}{f_{HIGH}}\right)$$

This equation can be used to scale the temporal fingerprints of the video image sequences with the lower image repetition rate by multiply it by the ratio of the two image rates.

Figure 4:
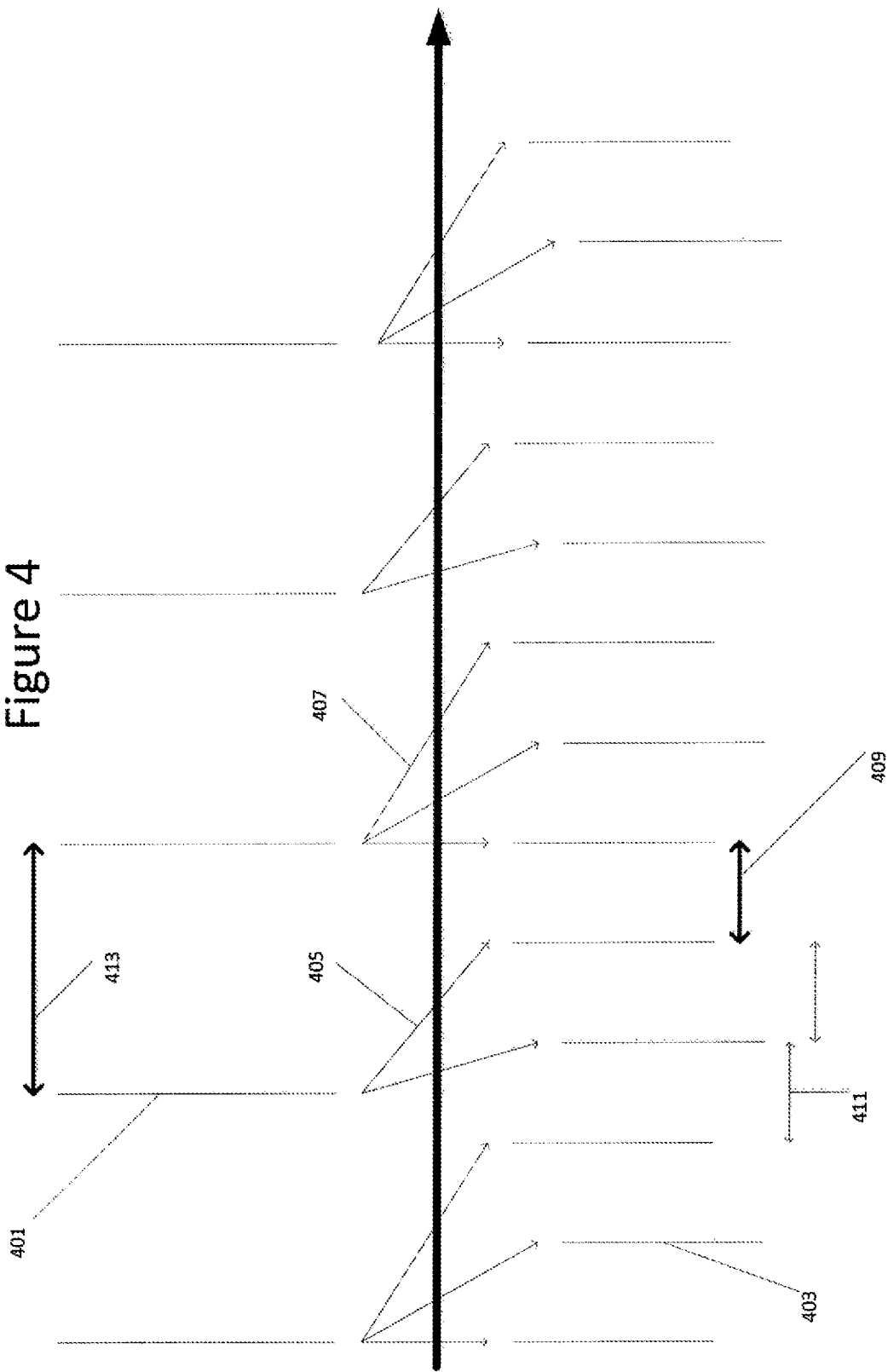
FIG. 4 is an illustration of the conversion of a sequence of images from a first frequency to a second higher frequency through the introduction of cadence by repeating images a set number of times in the higher frequency sequence.

FIG. 4 shows one example of the introduction of cadence into a sequence of video images. If a video is shot at a certain image rate (for example 24 Hz) but is shown to audiences at another image rate then cadence may be introduced. This is the introduction of duplicate images into the video sequence so that some of the images repeat themselves. Common forms of cadence include 3:2 cadence (shown in FIG. 4) where images are alternately repeated three times and then two times. This may raise the image rate of a video sequence form 24 Hz to 60 Hz. Another common form of cadence is 2:2 In this instance video recorded at 24 Hz is "played fast" at 25 Hz and then each image is repeated. This creates a video with an image rate of 50 Hz.

FIG. 4 shows a sequence of images 401. This has a period shown by arrow 413. The images are replicated (as shown by arrows 405 and 407). This is done in a periodic fashion. In this case a first image is repeated twice, and then a next image is repeated once, and then the next twice and so on. This produces a new sequence of images 403 in which cadence has been introduced. This new sequence of images has a different period 411.

Temporal fingerprints measure the difference between an image in a video sequence and the image that immediately precedes it (or the image immediately preceding it with the same parity) in the same video sequence. If cadence has been introduced to a video sequence, as shown in FIG. 4, then in some cases an image will be immediately preceded by an identical image. This means that the temporal fingerprint of the second image will have a value of zero or close to zero.

Some embodiments, described below, are envisaged in which cadence is detected in either of the first sequence of fingerprints 103, or the second sequence of fingerprints 101, or both.

For example, a method is contemplated in which cadence is detected of any 3:2 or 2:2 repetition of video images resulting from a previous film to video conversion process. The temporal fingerprints derived from these repeating video images are then replaced by a neighbouring non-zero temporal fingerprint, or another estimated value. This method may be used in conjunction with the method outlined for comparing a first sequence of fingerprints and a second sequence of fingerprints outlined with reference to FIG. 2.

The cadence detection may comprise identifying temporal fingerprints with values of zero, or close to zero. Alternatively, cadence detection may comprise identifying temporal fingerprint values of a video sequence that come in identical, or near identical sequential pairs.

In the event cadence is detected, in one embodiment, replacing temporal fingerprints derived from repeating video images by a neighbouring non-zero fingerprint or other estimated value comprises re-constituting the original temporal differences between the images. This may be done by deleting the fingerprints with a negligible value and then adjusting the positions of the remaining fingerprints in the sequence. In one embodiment this can be done by adjusting the positions of the remaining fingerprints in the sequence so that they occur at regular intervals, and so that they have an image rate of 24 Hz.

Figure 5:
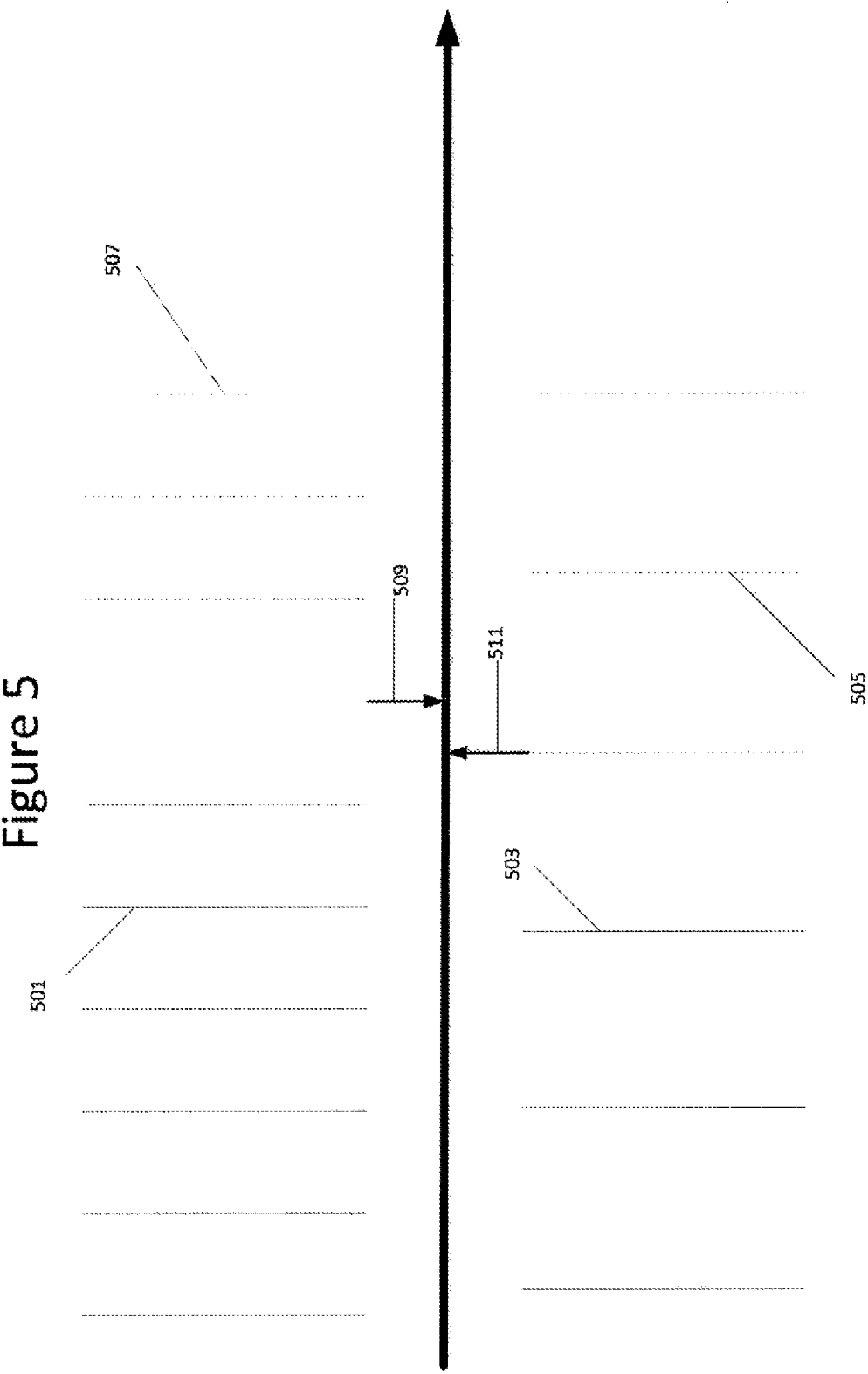
FIG. 5 is an illustration of the detection of a shot change in a low frequency sequence of fingerprints and a high frequency sequence of fingerprints.

As discussed above with reference to FIG. 2 it is envisaged that temporal fingerprints of sequences with different repetition rates do not always have to be scaled. For instance if cadence is detected scaling is not always necessary. A video may originally have a frequency of 24 Hz. Several versions of the video may be produced including a 3:2 cadence version shown at a frequency of 59.94 Hz and a 2:2 cadence version shown at 50 Hz. For both of these examples the temporal non-zero differences between consecutive images are the same as the original 24 Hz so scaling is unnecessary. FIG. 5 illustrates a first sequence of fingerprints 503, and a second sequence of fingerprints 501. Arrows 511 and 509 illustrate where a shot change takes place in the video sequences associated with these fingerprint sequences. The dashed sequences 505 and 507 are fingerprints after the shot change.

In some embodiments a method is envisaged in which shot changes are detected in the first and/or second sequence of video images and wherein temporal fingerprints derived from video images across a shot change are ignored or given reduced prominence in the correlation step. This method may be used in conjunction with the method of comparing a first sequence of fingerprints with a second sequence of fingerprints set out in relation to FIG. 8.

The shot changes may be detected by identifying temporal fingerprints that are above a pre-set threshold. As the image before a shot change likely bears little or no relation to the image immediately following a shot change there is likely to be a large temporal difference between them. This leads to a large temporal fingerprint. Therefore by finding large temporal fingerprint changes the shot changes can be identified.

In some embodiments ignoring or giving reduced prominence to temporal fingerprints derived across a shot change comprises replacing the temporal fingerprints derived across a shot change with either the temporal fingerprint immediately preceding or succeeding the shot change, or a combination of the two. In some embodiments this combination may be an average of the two fingerprints.

FIG. 6 illustrates a first image 601 and a second image 603. The first and second images are from the same sequence of video images. These sequences may be the sequences shown in any preceding Figure. The second image is a single video image. The first image is a previous single video image from the same video sequence. It occurs immediately before the single video image in the video sequence.

A temporal fingerprint may be formed by dividing the single video image into a number of blocks 607 and then dividing the previous single video image into the same blocks 605 as the single video image. The average luminescence of each block may then be found. This allows the corresponding blocks of the images to be compared with one another.

The differences between each of the blocks that correspond to one another are then found, and an overall difference between the images can be determined by calculating the sum of these absolute differences. This difference is the temporal fingerprint of the single video image. The fingerprints shown in FIGS. 1 and 2 may have been calculated this way. A fingerprint generation module may generate the fingerprints associated with an image sequence.

Arrow 609 shows that the two blocks of the images 605 and 607 correspond with one another. Arrow 611 shows that image 603 immediately follows image 601 in the video image sequence.

Figure 7:
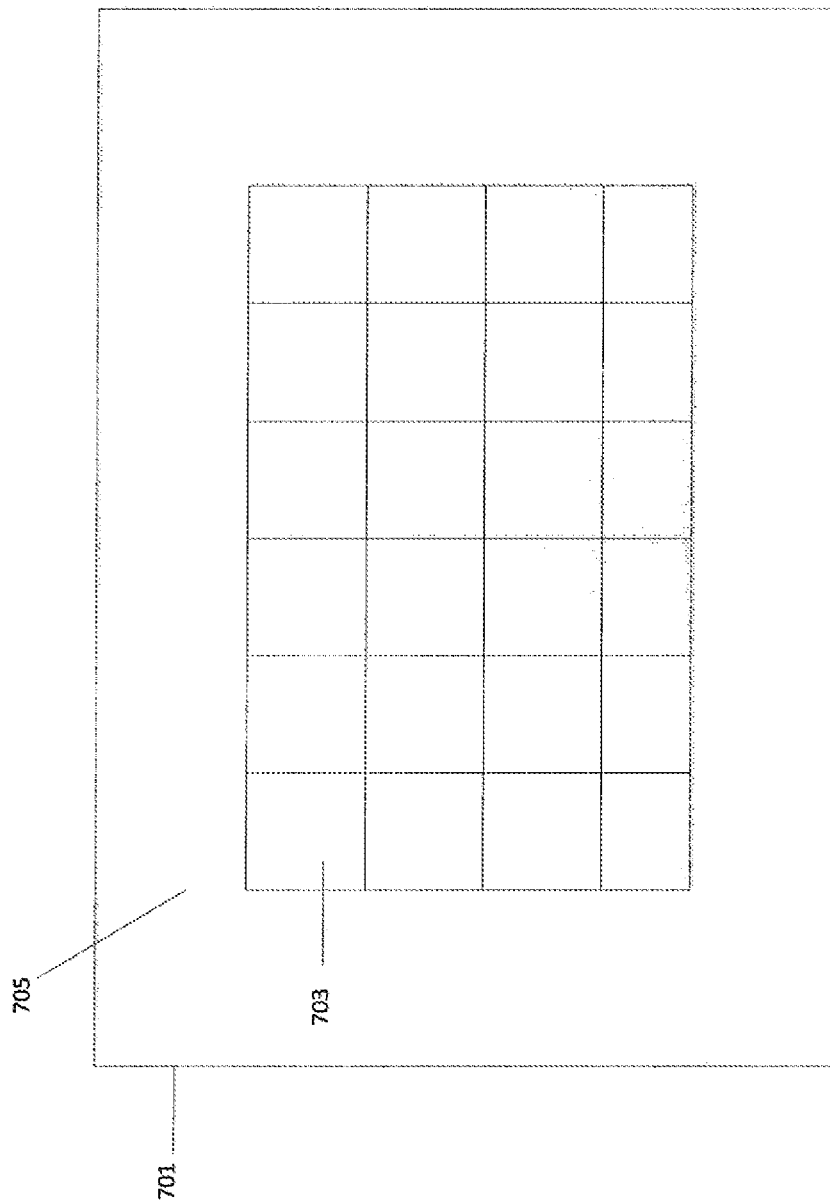
FIG. 7 is an illustration of the generation of a spatial fingerprint from an image.

FIG. 7 illustrates one embodiment of calculating a spatial fingerprint of an image 701. The spatial fingerprint of image 701 may be formed by discarding the edge of the image 705. This leaves only the central portion 703 of the image 701. The centre of the image can then be divided into a number of blocks. The average luminescence of these sections can then be found. In some embodiments these values may be summed or averaged to calculate a single value for the spatial fingerprint of image 701. A fingerprint generation module may generate the fingerprints associated with an image sequence.

Figure 8:
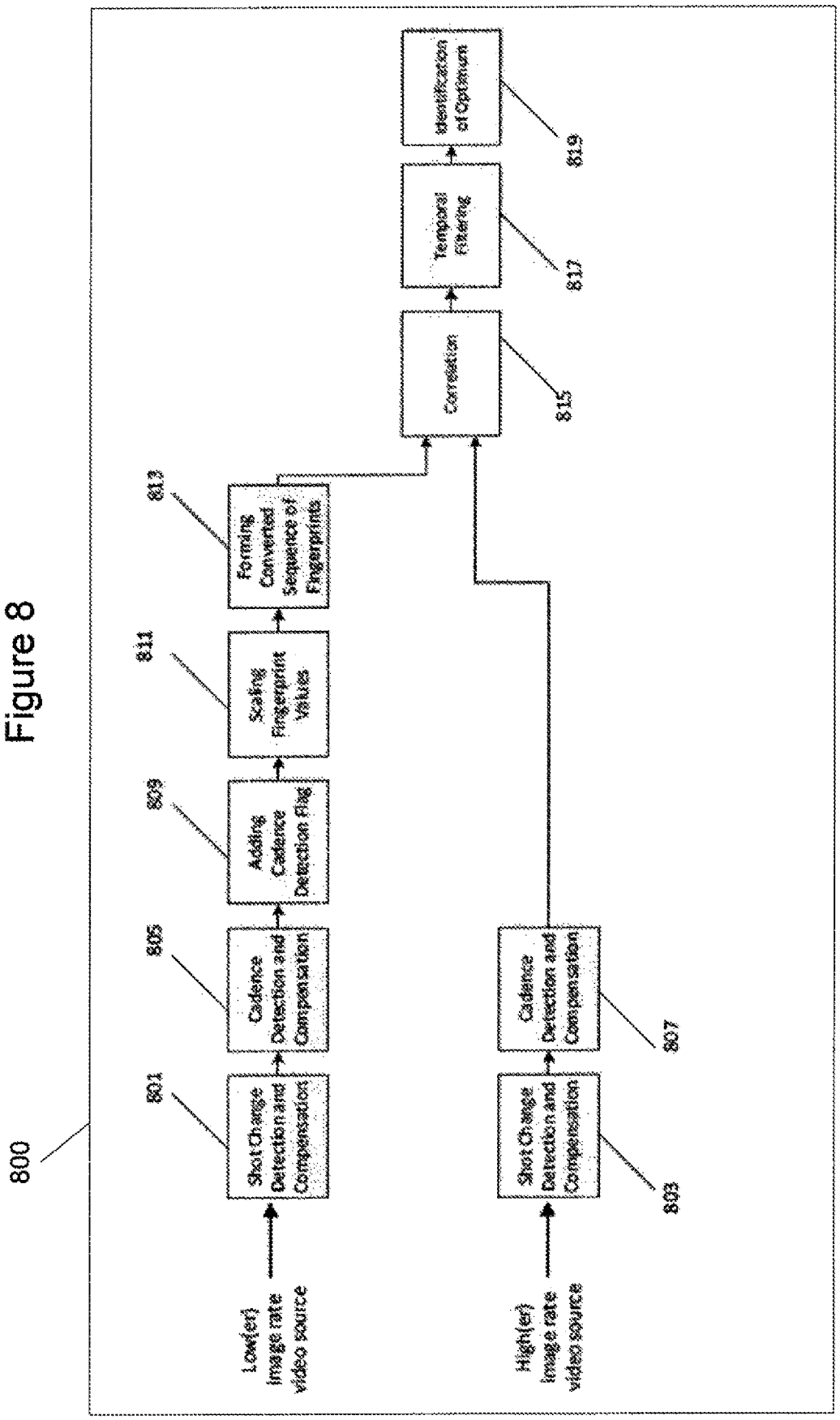
FIG. 8 shows a video processor, in accordance with some embodiments, with an illustration of a data flow for the method of comparing a high frequency sequence of fingerprints and a low frequency sequence of fingerprints to determine if they correlate with one another.

FIG. 8 illustrates a video processor 800 showing a low frequency input of a first sequence of fingerprints 103 representing a first sequence of video images at a first image repetition rate. FIG. 8 also shows a high frequency input of a second sequence of fingerprints 101 representing a second sequence of video images at a second image repetition rate. The second image repetition rate is different from the first image repetition rate. A first sequence of converted fingerprints may be generated from the first sequence of fingerprints that correspond with the first image sequence. The converted sequence of fingerprints has an image repetition rate that is the same as the second image repetition rate. A correlation may then be performed between the converted sequence of fingerprints and the second sequence of fingerprints.

FIG. 8 illustrates a method of comparing a first sequence of fingerprints with a second sequence of fingerprints. In this example the first sequence of fingerprints has a low input rate (and so a low image repetition rate) and the second sequence of fingerprints has a high rate input (and so a high image repetition rate). This method may be performed on a single apparatus, or the steps may be performed on separate apparatus. Each apparatus may comprise a processor and a data storage. The processor(s) is configured to perform the steps shown in FIG. 8. The data storage may record the results, or provide input data to the processor(s).

In some embodiments, and as illustrated in FIG. 8, both the low rate input and the high rate input may first have shot changes detected and then compensated 801. This may be done as described above with reference to FIG. 5.

Optionally cadence may then be detected and compensated for 805. This may be done as described above with reference to FIG. 4. In the event cadence is present in the low rate input a cadence flag 809 may be used to indicate that the temporal fingerprints in the low rate input do not need to be scaled.

Optionally the low rate input may then be compensated 811. This may be done as described with reference to FIG. 3.

A converted sequence of fingerprints is then formed 813. In some embodiments this may be as described with reference to FIG. 2.

The converted low rate input is then correlated 815 with the high rate input. This is done to identify the similarity between the two inputs. The correlation between the converted sequence of fingerprints and the second sequence of fingerprints may comprise performing one of: a discrete correlation function, a phase correlation process, a simple sum of absolute minimum differences as a function of offset, or an alternative matching function which compares the two inputs and returns a function which has an optimum point at an offset.

The correlation 815 may be configured to measure the correlation between the inputs to sub-sample precision (i.e. a fraction of an image period). The correlation may be performed by a correlator.

Temporal filtering 817 may be used in some embodiments to ensure that over a given temporal window the correlation is accurate.

Identification of optimum 819 is used to identify the optimum point in the temporally filtered correlation function, which establishes both how strong the correlation between the two inputs is.

Steps 801, 805, 809, 811, 817 and 819 are optional steps. These may be performed as part of the method. Some of these steps may be performed and others may not. For example, shot change compensation may not be performed but cadence compensation may be. Additionally in another alternative embodiment, the sample scaling and forming of the converted sequence of fingerprints may be performed on the high rate input, rather than on the low rate input. In this embodiment all of the features bar the fingerprint conversion and scaling are once more optional and any combination of them may be used.

In another embodiment the scaling and fingerprint conversion steps can be applied to both inputs. This would allow the fingerprint conversion to convert the first and second fingerprints to two sequences of fingerprints both with the same pre-set repetition rate. This may be advantageous in video libraries so that a standardised version of all the content can be produced. The scaling would then also have to be done to scale the temporal fingerprints to the pre-set standardised image repetition rate.

FIG. 9 shows one implementation of a system 900 to perform the method set out with reference to FIG. 8. In this example a live media, such as a sporting event is being shown around the world. Different countries use different broadcast standards therefore the broadcast must be converted to each of these different standards.

In the embodiment shown in FIG. 9, the live media is first edited using an editor 901 before being delivered around the world. This is an optional step. In this example, the live media is being sent to the USA. Therefore the image rate is converted at 903 from 50 Hz to 59.94 Hz. The broadcast is then encoded for sending using an encoder 905. This broadcast is then received in the USA and is decoded using a decoder 907. The received broadcast is fingerprinted using a finger print generator 909 to form a sequence of fingerprints corresponding to the US broadcast. The original live media is also fingerprinted using a fingerprint generator 911. This allows the two fingerprint sequences to be correlated with each other using a correlator 913. This is done using the method described above.

This allows quick verification of whether the content that has been sent to the US is the same content as the original live stream. This media match verification is useful for ensuring that the correct content is always being sent.

This method also allows for lip synchronisation measurements to be made to ensure that both broadcasts have an accurate lipsync. Because the images are now being broadcast with a different repetition rate the original audio may not completely match up with the new rate. This measurement aids in the determination of any problems so that a better lipsync can be added to the broadcast.

In another embodiment the method set out above may be used to compare content from a film archive. In this context cadence is more likely to be present because cadence is applied to many films. In this example, the fingerprinting of both films may be performed at the same location, and in some embodiments, by the same electronic device. In some embodiments this same electronic device may be used to perform the correlation.

It will be appreciated from the discussion above that the embodiments shown in the Figures are merely exemplary, and include features which may be generalised, removed or replaced as described herein and as set out in the claims. With reference to the drawings in general, it will be appreciated that schematic functional block diagrams are used to indicate functionality of systems and apparatus described herein. For example the steps shown in FIGS. 8 and 9 may be combined into single steps. These steps may also be performed on a single apparatus, or each step may be performed at a separate apparatus. The apparatus performing the method steps may include a data storage and a processor.

Alternatively the functionality provided by the data storage may in whole or in part be provided by the processor. In addition the processing functionality may also be provided by devices which are supported by an electronic device. It will be appreciated however that the functionality need not be divided in this way, and should not be taken to imply any particular structure of hardware other than that described and claimed below. The function of one or more of the elements shown in the drawings may be further subdivided, and/or distributed throughout apparatus of the disclosure. In some embodiments the function of one or more elements shown in the drawings may be integrated into a single functional unit.

The above embodiments are to be understood as illustrative examples. Further embodiments are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

In some examples, one or more memory elements can store data and/or program instructions used to implement the operations described herein. Embodiments of the disclosure provide tangible, non-transitory storage media comprising program instructions operable to program a processor (for example, video processor 800) to perform any one or more of the methods described and/or claimed herein and/or to provide data processing apparatus as described and/or claimed herein.

The processor (for example, the video processor 800) of any apparatus used to perform the method steps (and any of the activities and apparatus outlined herein) may be implemented with fixed logic such as assemblies of logic gates or programmable logic such as software and/or computer program instructions executed by a processor. Other kinds of programmable logic include programmable processors, programmable digital logic (e.g., a field programmable gate array (FPGA), an erasable programmable read only memory (EPROM), an electrically erasable programmable read only memory (EEPROM)), an application specific integrated circuit, ASIC, or any other kind of digital logic, software, code, electronic instructions, flash memory, optical disks, CD-ROMs, DVD ROMs, magnetic or optical cards, other types of machine-readable mediums suitable for storing electronic instructions, or any suitable combination thereof

What is claimed is:

1. An apparatus for validating synchronization of a distributed video signal, the apparatus comprising:
    a video sequence receiver configured to obtain a first sequence of fingerprints at a first image repetition rate for a first video image sequence and a second sequence of fingerprints at a second image repetition rate for a second video image sequence, wherein each of the first and second video image sequences are derived from the distributed video signal;
    a fingerprint sequence converter configured to generate a first converted sequence of fingerprints by converting the first sequence of fingerprints at the first image repetition rate to a comparison image repetition rate that is common with the second sequence of fingerprints at the second image repetition rate;
    a correlator configured to perform a correlation between the first converted sequence of fingerprints and the second sequence of fingerprints at the comparison image repetition rate; and
    a video signal analyzer configured to validate the distributed video signal based on the performed correlation by confirming the first video image sequence contains same video content as the second video image sequence;
    wherein the second image repetition rate is different from the first image repetition rate;
    wherein the comparison image repetition rate is one of the second image repetition rate or a common image repetition rate of a second converted sequence of fingerprints generated by converting the second sequence of fingerprints at the second image repetition rate to the common image repetition rate;
    wherein the converted sequence of fingerprints includes a combination of a number of neighboring fingerprints in the first sequence of fingerprints; and
    wherein the fingerprints of the first and second sequences of fingerprints are at least one of spatial fingerprints derived each from content of a single video image, temporal fingerprints derived each from a difference in content between two video images, or a combination of spatial and temporal fingerprints.

2. The apparatus of claim 1, wherein the combination of the number of neighboring fingerprints includes a weighted average based on a temporal location of the respective neighboring fingerprints in the first sequence of fingerprints in which a temporal fingerprint in the first sequence of fingerprints is scaled in accordance with a ratio of the first and second image repetition rates.

3. The apparatus of claim 1, further comprising at least one fingerprint creation module configured to form the fingerprints of the first and second sequences of fingerprints.

4. The apparatus of claim 1, further comprising a shot change detector configured to detect shot changes in at least one of the first and second video image sequences, and wherein temporal fingerprints derived from video images across a shot change are ignored or given reduced prominence when the correlator performs the correlation.

5. The apparatus of claim 1, wherein the correlator is further configured to perform the correlation between the first converted sequence of fingerprints and the second sequence of fingerprints by performing one of a discrete correlation function, a phase correlation process, a simple sum of absolute minimum differences as a function of offset, or an alternative matching function that compares two inputs and returns a function that has an optimum point at an offset position.

* * * * *

UNITED STATES PATENT AND TRADEMARK OFFICE
CERTIFICATE OF CORRECTION

| | |
|---|---|
| PATENT NO. | : 11,222,209 B2 |
| APPLICATION NO. | : 16/549994 |
| DATED | : January 11, 2022 |
| INVENTOR(S) | : Jonathan Diggins |

It is certified that error appears in the above-identified patent and that said Letters Patent is hereby corrected as shown below:

On the Title Page

After Related U.S. Application Data, please add the following:
-- (30) Foreign Application Priority Data
Aug. 24, 2016 (GB) .............................. 1614435.4 --

Signed and Sealed this
Fourth Day of October, 2022

*Katherine Kelly Vidal*

Katherine Kelly Vidal
*Director of the United States Patent and Trademark Office*